2,991,472
Patented July 4, 1961

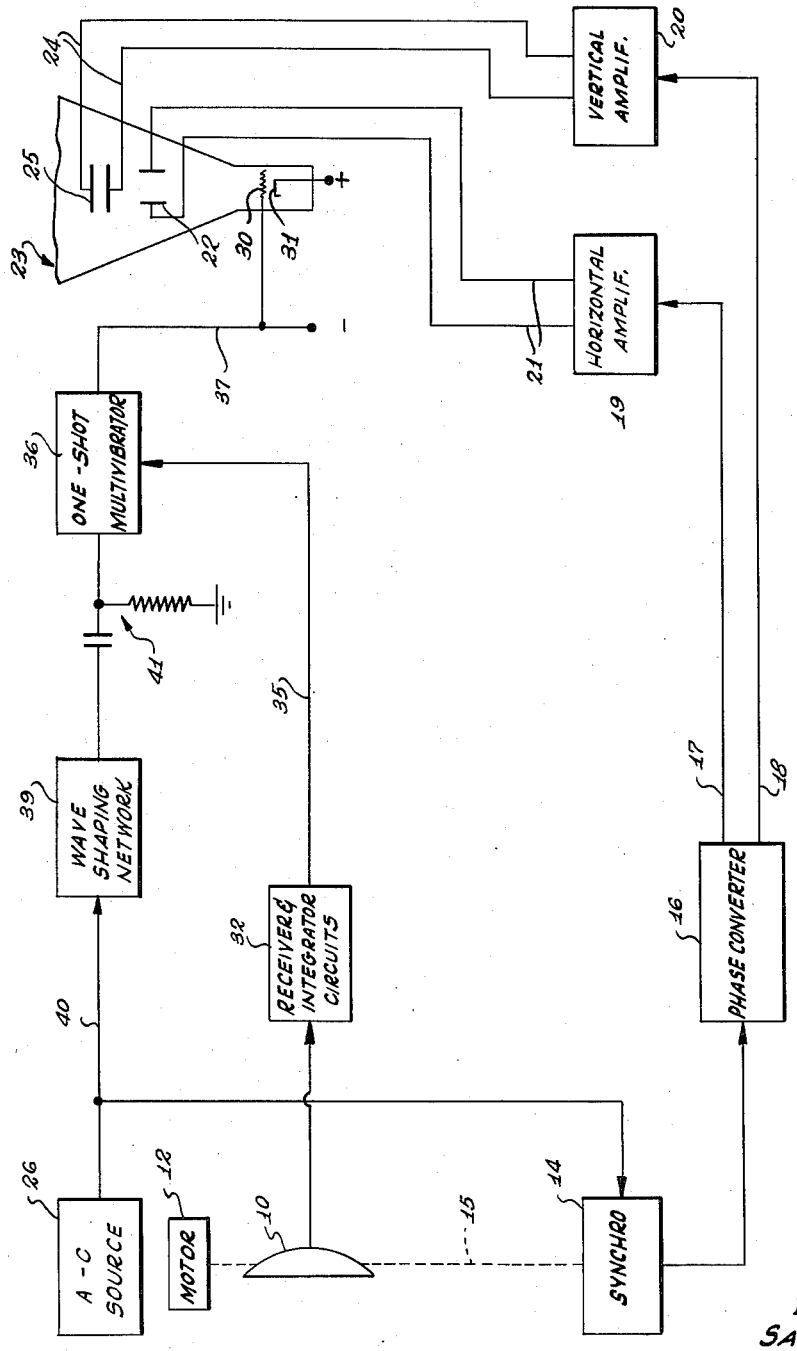

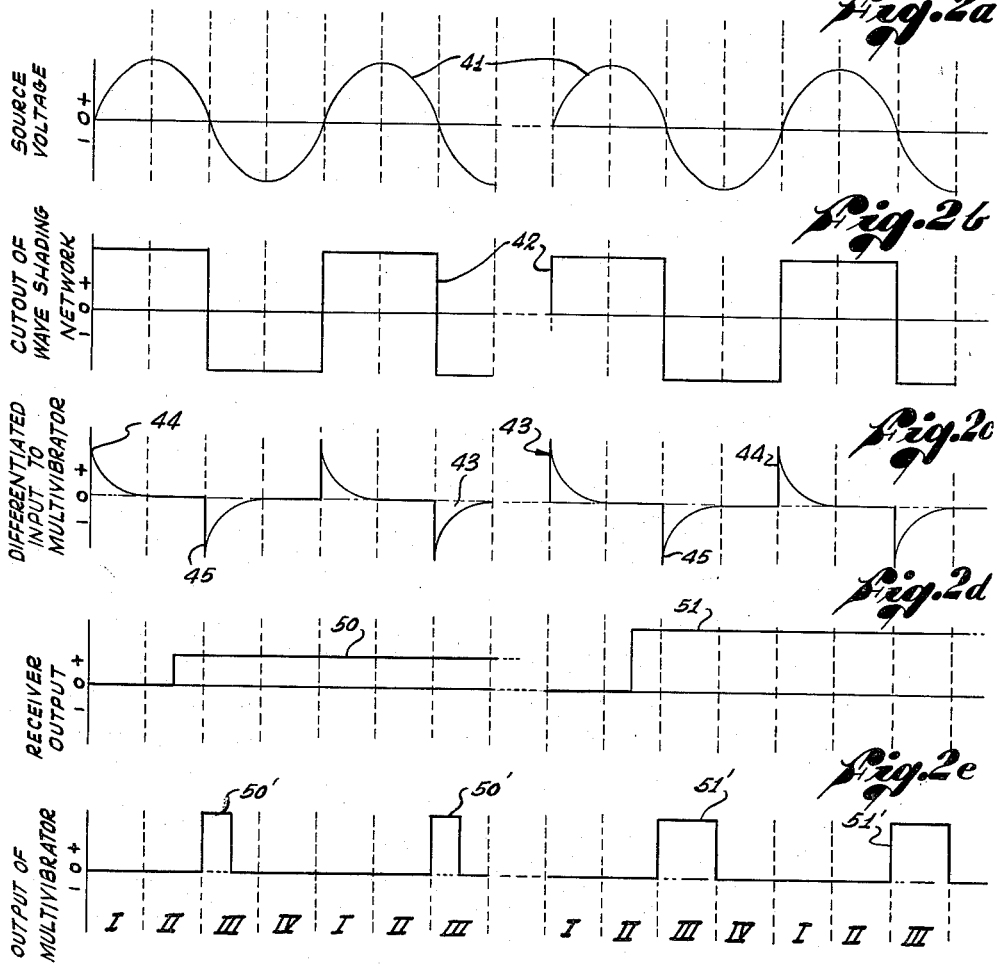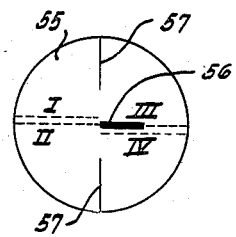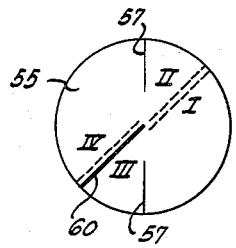

2,991,472
SIGNAL STRENGTH INDICATOR
Sam Messin, Ventura, Calif., assignor to U.S. Industries, Inc., New York, N.Y., a corporation of Delaware
Filed May 26, 1959, Ser. No. 815,930
4 Claims. (Cl. 343—118)

This invention relates to visual indicators, and more particularly to circuit means with which to obtain a desired visual display with an electron lens, such as cathode ray tubes and the like.

As is well known, cathode ray tubes (C.R.T.) are conventionally employed in oscilloscopes for study and measurement of various electrical and magnetic phenomena. Generally, the applications of an oscilloscope using a cathode ray tube involve the study of change of voltage or current with time, or comparison of the relative amplitudes or phase relationships of voltages or currents. The oscilloscope trace is the result of the effects on the electron beam of voltages or currents applied to horizontal and vertical deflection plates or coils, depending upon whether the movement of the electron beam is controlled electrostatically or electromagnetically.

For some purposes the brightness of the spot on the C.R.T. screen is varied, as by changing the bias voltage on the control grid of the tube. This has had important applications in object-detecting systems such as radar, where pulses reflected from an object are utilized to brighten half of a rotating or scanning line trace to reveal a radial line disposed at an angle corresponding to the bearing of the object with respect to the receiver. However, the brightness control effected by the conventional object-detecting system is nothing more than an "on-off" control. Since the lines revealed during reception of reflected signals are of the same length, their display provides no information concerning the relative strengths of the signals.

It is an object of this invention to provide a C.R.T. indicator which provides a vectorial representation of a signal.

It is another object of this invention to provide a C.R.T. display of a straight line oriented to represent the direction from which a signal arrives at a receiver, and which has a length corresponding to the strength of the signal.

A further object of this invention is to provide a C.R.T. indicator in which a beam intensifying pulse of varying width is used to control the length of a trace displayed on the screen.

A still further object of this invention is to provide a unique control circuit for a C.R.T. indicator, in which intensifying pulses varying in width are utilized to control the visible portion of the trace.

It is also an object of this invention to provide a network for controlling the operation of a C.R.T.-type tube, which comprises a minimum number of component parts of simple design, and which functions to effect a display on the C.R.T. screen of a parameter of an electrical characteristic which has not heretofore been possible.

The above and other objects and advantages of this invention will become apparent from the following description taken in conjunction with the accompanying drawings of an illustrative embodiment thereof, and in which:

FIGURE 1 is a combined block and schematic diagram of a C.R.T. indicator, showing horizontal and vertical deflection plates connected to establish a revolving straight line which follows the rotation of an antenna element, and showing means connected to the antenna element to develop blanking control pulses of varying width to establish what portion of the line will be made visible;

FIGURE 2a is a plot of voltage against time, showing the sinusoidal form of the output of the source;

FIGURE 2b is a plot of voltage against time, showing the square wave voltage developed by the wave-shaping network;

FIGURE 2c is a plot of voltage against time, showing the differentiated voltage waveform developed from the square wave for applying trigger pulses to the multivibrator;

FIGURE 2d is a plot of voltage against time, showing the varying D.-C. signals applied to the multivibrator from the receiver;

FIGURE 2e is a plot of voltage against time illustrating how the widths of the blanking control voltage pulses varies with the magnitude of the D.-C. signals; and FIGURES 3 and 4 are plan views of the screen of the cathode ray tube, illustrating schematically the formation on the screen of visible traces having lengths corresponding to the strengths of the received signals.

Referring to FIGURE 1, there is shown a directional antenna 10 which is adapted to be rotated by a motor 12. The rotor of a synchro device 14 is mechanically coupled to the antenna 10, as at 15, for rotation therewith, such synchro having its stator windings connected to a phase converter 16 which has a double-ended output, indicated at 17 and 18, at which voltages 90 degrees out of phase appear. A suitable three-phase to two-phase converter for the converter 16 is the well-known Scott transformer.

The output connections 17, 18 of the phase converter 16 are connected to respective amplifiers which are designated the horizontal amplifier 19 and vertical amplifier 20. The output of the horizontal amplifier 19, indicated at 21, is connected across the horizontal deflection plates 22 of the C.R.T. 23. The output of the vertical amplifier 20 is connected, as at 24, to the vertical deflection plates 25 of the C.R.T. 23.

A source 26 of alternating voltage is coupled to the rotor of the synchro 14. This means that with the above-described arrangement, upon the synchro rotor being rotated with the antenna 10, the phase converter 16 develops output voltages which are 90 degrees out of phase, and which vary between maximum and minimum amplitudes depending as the angular position of the antenna 10 varies. This will be recognized as the conventional mode of controlling the voltages on the deflection plates 22, 25 so that the electron beam sweeps out a straight line trace. The straight line trace is caused to rotate due to the variations in the magnitudes of the voltages appearing in the outputs of the horizontal and vertical amplifiers 19, 20.

As previously indicated, brightness control of the beam trace is effected through the application of control voltages to the control grid 30 of the C.R.T. 23, so as to vary the intensity of the electron stream passing through the grid 30 from the emitter 31. In my invention, I control the voltage applied to the control grid 30 so as to provide a trace of a length corresponding to the strength of signals received by the antenna 10. To this end, I provide receiver means 32 connected to the antenna 10, as at 33, which includes suitable circuits, i.e., integrator circuits, to provide a D.-C. output voltage which has a magnitude corresponding to the strength of the signals arriving at the antenna 10.

The output of the receiver 32 is applied, as at 35, to a one-shot multivibrator 36 which is periodically triggered into operation. This device has been used generally to develop output pulses of equal duration. However, the duration of such pulses may be made to correspond to the magnitude of a grid voltage setting; accordingly, the manner in which I use the multivibrator, i.e., by using varying D.-C. grid potentials, results in output pulses of constant amplitude, but of varying duration. The width of the pulses corresponds to the magnitude of the D.-C. signal present in the output of the receiver 32 at the time the multivibrator 36 is triggered. These pulses are applied, as at 37, to the control grid 30.

The control grid 30 is normally biased so that the beam is blanked, so that no trace appears on the screen. Thus, the grid 30 is normally sufficiently negative with respect to the emitter 31 to prevent the beam from being visible. To this end, there may be a conventional potentiometer (not shown), wherein the grid 30 is connected to the sliding contact which is manually set as required to blank out the trace.

The multivibrator 36 is arranged to be fired only when the electron beam is passing through the center of the C.R.T. screen. The ensuing pulses raise the potential on the grid 30, for the duration of such pulses, to unblank the beam and cause a visible trace to be presented on the screen.

To accomplish this result, I connect a waveform shaping network 39 to the source 26, as at 40, and from its output wave 41 (see FIGURE 2a) develop a square wave voltage 42 (see FIGURE 2b). The square wave output of the network 39 is differentiated, as by a conventional RC differentiating network 41. The differentiated voltage 43 (see FIGURE 2c), which comprises a positive pip or spike 44 and a negative pip or spike 45 for the respective positive-going and negative-going portions of the square wave, is applied to the multivibrator 36. The multivibrator is triggered by the negative pips 45.

The successive quarter-cycle periods for the source voltage are indicated as I, II, III, IV. At the beginning of each half cycle, i.e., the beginning of periods I and III, the voltages applied to the horizontal and vertical deflection plates 22, 25 are such that the beam is directed to the center of the screen. The beam is caused to move in one direction during the positive half cycle, and in the opposite direction during the negative half cycle. At the beginning of the remaining quarter-cycle periods, the beam is at the outermost point on the screen, from which it retraces its path to return toward the center of the screen. Thus, the voltage pips 44, 45 occur when the beam is at the center of the screen.

FIGURE 2d illustrates two D.-C. signals 50, 51 of different magnitudes appearing at different times in the output of the receiver 32. The larger D.-C. signal 51 is shown to be of such magnitude that the pulses 51' developed by the multivibrator in response thereto extend throughout the quarter-cycle periods during which they are established. The smaller D.-C. signal 50 is smaller than that required to generate a pulse of a quarter-cycle duration; instead, the pulses 50' extend for only that portion of the quarter-cycle period corresponding to the magnitude of the D.-C. signal 50.

FIGURE 3 illustrates the screen 55 of the tube 23 having a visible straight-line trace 56 generated in response to the intensifying pulses 50'. Spaced vertical index lines 57 provide reference markers.

The sweep of the beam across the face of the screen 55 is illustrated as S-shaped; however, it will be recognized that this presentation is merely for purposes of illustration, the actual progress of the beam being back and forth along the same straight line. As previously indicated, each half trace lasts for a quarter-cycle period; starting from the center, the first quarter cycle sweep extends to the left (designated at I), then returns at III to the center, thence at III to the opposite end of its sweep, and retracing its path at IV to the center, from which point the cycle is repeated. Since the pulses 50' extend for only a portion of the periods III, and the generation of the pulses 50' coincides with the beginning of such periods when the beam is moving from the center of the screen 55, the trace 56 made visible to the observer extends for only that portion of the period III corresponding to the width of the pulses 50'.

FIGURE 4 similarly presents the effect of pulses 51', with the trace 60 extending in a direction corresponding to a different position of the antenna 10. Since the pulses 51' extend throughout the periods III, and like the pulses 50' appear at the beginning of such periods (when the electron beam is moving from the center of the screen 55), the trace 60 extends from the center to the outermost point of the sweep of the beam.

It will be apparent that my novel system has unique uses. For example, the receiver may develop D.-C. signals which correspond to the distances of different objects from a pick-up device, as where signals arrive at the antenna with an intensity, repetition rate, etc., corresponding to the distance of the travel of signals.

While I have described my invention with reference to one embodiment thereof, it will be recognized that various modifications can be made without departing from the spirit and scope of my invention. Accordingly, I do not intend that my invention be limited, except in accordance with the reasonable interpretation of the appended claims.

I claim:
1. In combination with a cathode ray tube having means to effect movement of an electron beam on its screen in a predetermined pattern, a system for controlling the intensity of the beam to determine the portion of the pattern to be made visible on the screen, comprising: means normally controlling the intensity of the beam so that no trace is visible on the screen; an alternating current source; a movable signal pickup device; means coupled to said pickup device and said source to develop voltages for moving the beam so that the position of the pattern represents the position of said pickup device; means to develop D.-C. signals having amplitudes corresponding to the strength of signals arriving at said pickup device; means operable during each cycle of the output from said source to develop a pulse having a duration corresponding to the magnitude of the existing D.-C. signal; and means operable during the existence of the pulses to increase the intensity of the beam and make its trace visible on the screen.

2. In combination with an electron lens device having a screen, wherein the device has elements for effecting movement of an electron beam along its screen in a predetermined pattern, a system for controlling the intensity of the beam comprising: means normally controlling the intensity of the beam so that no trace is visible on the screen; a source of alternating voltage of predetermined frequency; a movable signal pickup device; means coupled to said pickup device and said source to develop voltages of said frequency for moving the beam so that the position of the pattern represents the position of said pickup device; means to develop D.-C. signals having amplitudes corresponding to the strength of signals arriving at said pickup device; means operable during each cycle of the output from said source to develop a pulse having a duration corresponding to the magnitude of the existing D.-C. signal; and means operable during the existence of the pulses to increase the intensity of the beam and make its trace visible on the screen.

3. In combination with a cathode ray tube having means to effect movement of an electron beam on its screen in a predetermined pattern, a system for controlling the intensity of the beam to determine the portion of the pattern to be made visible on the screen, comprising: means normally controlling the intensity of the beam so that no trace is visible on the screen; a source of alternating voltage of predetermined frequency; a rotatable signal pickup device; means coupled to said pickup device and said source to develop voltages of said frequency for moving the beam so that the position of the pattern represents the position of said pickup device; receiver means to develop D.-C. signals having amplitudes corresponding to the strength of signals arriving at said pickup device; a one-shot multivibrator; means responsive to the output of said source to develop periodic trigger pulses for said multivibrator, said multivibrator being operable each time it is triggered to develop a pulse having a duration corresponding to the magnitude of the D.-C. signal existing in the output of said receiver means; and means operable during the existence of the pulses to increase the intensity of the beam and make its trace visible on the screen.

4. An indicator system comprising: a cathode ray tube having emitter, control grid and respective deflecting elements; a directional signal pickup device, said device being rotatable; a synchro device having a rotor operable by said pickup device, said device having a rotor and stator windings; a source of alternating voltage coupled to the rotor winding of said synchro device; a phase converter coupled to the stator windings to develop a pair of voltages 90° out of phase; respective amplifier means to apply the voltages from the converter to said deflecting elements; a receiver coupled to said pickup device, said receiver having means to develop D.-C. voltages corresponding in magnitude to the strength of signals arriving at the pickup device; a one-shot multivibrator coupled to said control grid; a wave shaping network coupled to said source to develop a square wave voltage; and a differentiating network connected between said wave shaping network and said multivibrator.

References Cited in the file of this patent
UNITED STATES PATENTS 2,654,085     Goldstein  ------------ Sept. 29, 1953

OTHER REFERENCES

Principles of Radar, M. I. T. Radar School Staff, McGraw-Hill Book Co., 2nd. ed., New York, 1946, pages 2–53 to 2–58.